(12) United States Patent
Pikus et al.

(10) Patent No.: US 10,846,448 B1
(45) Date of Patent: Nov. 24, 2020

(54) LIMITED BASIS QUANTUM PARTICLE DEFINITIONS IN APPLICATIONS OF QUANTUM COMPUTING TO ELECTRONIC DESIGN AUTOMATION PROCESSES

(71) Applicant: Mentor Graphics Corporation, Wilsonville, OR (US)

(72) Inventors: Fedor G. Pikus, Beaverton, OR (US); Shashank Jaiswal, West Lafayette, IN (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/687,929

(22) Filed: Nov. 19, 2019

(51) Int. Cl.
*G06F 30/30* (2020.01)
*G06N 10/00* (2019.01)
*G06F 119/18* (2020.01)

(52) U.S. Cl.
CPC ............. *G06F 30/30* (2020.01); *G06N 10/00* (2019.01); *G06F 2119/18* (2020.01)

(58) Field of Classification Search
CPC ...... G06F 30/30; G06F 2119/18; G06N 10/00
USPC ........................................................ 716/102
See application file for complete search history.

(56) References Cited

U.S. PATENT DOCUMENTS

| | | | | |
|---|---|---|---|---|
| 9,779,198 B2 * | 10/2017 | Kang | ........................ | G03F 1/36 |
| 2012/0072875 A1 * | 3/2012 | Ghosh | ................... | G06F 30/398 |
| | | | | 716/52 |
| 2016/0098511 A1 * | 4/2016 | Cecil | ................... | G03F 7/70433 |
| | | | | 716/53 |

OTHER PUBLICATIONS

Michael A. Nielsen and Isaac L. Chuang, "Quantum Computation and Quantum Information", 10th Anniversary Edition, Cambridge University Press, New York, NY, 2002, pp. 1-703.
L. K. Grover, "Quantum Mechanics Helps in Searching for a Needle in a Haystack", Physical Review Letters, vol. 79, No. 2, Jul. 1997, pp. 325-328.
Peter W. Shor, "Polynomial-Time Algorithms for Prime Factorization and Discrete Logarithms on a Quantum Computer", Siam J. Comput., vol. 26, No. 5, Oct. 1997, pp. 1484-1509.
J. Biamonte, P. Wittek, N. Pancotti, P. Rebentrost, N.Wiebe and S. Lloyd, "Quantum machine learning", Nature, vol. 549, Issue 7671, Sep. 2017, pp. 195-202.
John Nash, "Non-Cooperative Games", Annals of Mathematics, Second Series, vol. 54, No. 2, Sep. 1951, pp. 286-295.

(Continued)

*Primary Examiner* — Suresh Memula (57) ABSTRACT

A system may include a quantum model engine configured to generate (e.g., load or instantiate) a quantum computing model to represent an electronic design automation (EDA) process for a circuit design. The EDA process may be a multi-patterning process to assign colors to geometric elements of the circuit design. The quantum computing model may include quantum particle types that may be defined to prohibit non-physical states in the quantum computing model from occurring. The quantum model engine may also be configured to generate a color assignment for the geometric elements of the circuit design through the quantum computing model. The system may also include a manufacture support engine configured to use the color assignment to support manufacture of circuit layers of the circuit design through multiple manufacturing steps.

20 Claims, 7 Drawing Sheets

(56) References Cited

OTHER PUBLICATIONS

Eleanor G. Rieffel, Davide Venturelli, Bryan O'Gorman, Minh B. Do, Elicia Prystay and Vadim N. Smelyanskiy, "A case study in programming a quantum annealer for hard operational planning problems", Quantum Information Processing, vol. 14 (1), 2015, pp. 1-36.

Donald E. Knuth, "The Art of Computer Programming", vol. 4A, Combinatorial Algorithms, Part 1, Addison-Wesley, Boston, MA US, Jan. 2011, pp. 1-911.

Edward Farhi, Jeffrey Goldstone and Sam Gutmann, "A Quantum Approximate Optimization Algorithm", arXiv:1411.4028v1 [quant-ph], Nov. 14, 2014, pp. 1-16.

P. Erdös and A. H. Stone, "On the Structure of Linear Graphs", Bulletin of the American Mathematical Society, vol. 52, No. 12, 1946, pp. 1087-1091.

P. Erdös and L. Lovasz, "Problems and Results on 3-Chromatic Hypergraphs and Some Related Questions", Infinite and finite sets, vol. 10, 1975, pp. 609-627.

Rupak Biswas, Zhang Jiang, Kostya Kechezhi, Sergey Knysh, Salvatore Mandr_A, Bryan O'Gorman, Alejandro Perdomo-Ortiz, Andre Petukhov, John Realpe-Gomez, Eleanor Riefel, Davide Venturelli, Fedir Vasko and Zhihui Wang, "A NASA Perspective on Quantum Computing: Opportunities and Challenges", Parallel Computing, vol. 64, May 2017, pp. 81-98.

Edward Farhi, Jeffrey Goldstone and Sam Gutmann, "Quantum Computation by Adiabatic Evolution", arXiv:quant-ph/0001106, 2016, https://arziv.org/abs/quant-ph/0001106, pp. 1-24.

E. Crosson, E. Farhi, C. Y-Y Lin, H.-H. Lin and Peter Shor, "Different Strategies for Optimization Using the Quantum Adiabatic Algorithm", arXiv preprint arXiv:1401.7320, 2014, pp. 1-17.

John Preskill, "Quantum Computing in the NISQ era and beyond", Institute for Quantum Information and Matter and Walter Burke Institute for Theoretical Physics, California Institute of Technology, Pasadena CA 91125, USA, Quantum vol. 2, Jul. 30, 2018, 1-20 pgs.

S. Knot, "Hardness of Approximation", Proceedings of the International Congress of Mathematicians, Seoul, Korea, 2014, pp. 711-728.

B. Altshuler, H. Krovi and J. Roland, "Anderson localization makes adiabatic quantum optimization fail", Proceedings of the National Academy of Sciences, vol. 107, No. 28, Jul. 13, 2010, pp. 12446-12450.

N. G. Dickson and M. Amin, "Does Adiabatic Quantum Optimization Fail for NP-complete Problems?", Physical Review Letters, vol. 106, 050502, Feb. 2011, pp. 1-4.

D. Poulin, k Qarry, R. Somma and F. Verstraete, "Quantum simulation of time-dependent Hamiltonians and the convenient illusion of Hilbert space", Physical Review Letters, vol. 106, 170501, 2011, pp. 1-6.

V. Choi, "Different Adiabatic Quantum Optimization Algorithms for the NP-Complete Exact Cover and 3SAT Problems", Proceedings of the National Academy of Sciences to the United States of America, vol. 108, E19, 2011, pp. 1-10.

Vicky Choi, "Minor-embedding in adiabatic quantum computation: I. The parameter setting problem", Quantum Information Processing, vol. 7, 2008, pp. 193-209.

Jun Cai, Bill Macready and Aidan Roy, "A practical heuristic for finding graph minors", arXiv preprint arXiv:1406.2741, Jun. 2014, pp. 1-16.

Keith A. Britt and Travis S. Humble, "High-Performance Computing with Quantum Processing Units", ACM Journal on Emerging Technologies in Computing Systems (JETC), vol. 13, No. 3, Article 39, Mar. 2017, pp. 39:1-39:13.

* cited by examiner

LIMITED BASIS QUANTUM PARTICLE DEFINITIONS IN APPLICATIONS OF QUANTUM COMPUTING TO ELECTRONIC DESIGN AUTOMATION PROCESSES

BACKGROUND

Electronic circuits, such as integrated circuits, are used in nearly every facet of modern society from automobiles to microwaves to personal computers. Design of circuits may involve many steps, known as a "design flow." The particular steps of a design flow are often dependent upon the type of microcircuit being designed, its complexity, the design team, and the circuit fabricator or foundry that will manufacture the circuit. Electronic design automation (EDA) applications support the design and verification of circuits prior to fabrication. EDA applications may implement various EDA procedures, e.g., functions, tools, or features to analyze, test, or verify a circuit design at various stages of the design flow.

BRIEF DESCRIPTION OF THE DRAWINGS

Certain examples are described in the following detailed description and in reference to the drawings.

DETAILED DESCRIPTION

Modern integrated circuits continue to increase in complexity and structural density. In modern lithographic manufacturing processes, a single physical layer of an integrated circuit device can be formed using multiple manufacturing steps, e.g., via two or more separate lithographic masks. To support construction of physical layers using multiple masks, geometric elements (e.g., polygons) in layout design data representing a physical layer of an integrated circuit can be partitioned into two or more groups, which may be referred to herein as "colors." The colors may correspond to different lithographic masks that are complementarily used to form a physical layer of the integrated circuit.

Layout design data may also be referred to as circuit layers or fabric layers. A circuit layer may include a layer of circuit components in the form of geometric elements, such as polygons, circular or elliptical shapes, or other geometric shapes. Geometric elements of a circuit layer may represent shapes that will be created (e.g. etched via lithography) in various materials/substrates to physically manufacture an integrated circuit. As such, geometric elements in a circuit layer may represent (individually or in combination) circuit components such as contacts, channels, gates, etc.

Geometric elements in a fabric layer may be colored to designate different lithographic masks that the geometric elements will be manufactured from. To illustrate, a circuit layer may include a series of closely-spaced parallel connective lines, and a multi-patterning process to color the fabric may partition different the adjacent lines such that a first of the adjacent lines is physically formed by a different lithographic mask than a second of the adjacent lines. As such, the first and second line on the same physical layer of the circuit may be physically formed in separate manufacturing steps (e.g., different lithographic processes). This technique may be referred to as "double-patterning", as geometric elements of a circuit design may be assigned (also referred to as colored or patterned) with one of the two colors in a double-patterning scheme. In a consistent manner, techniques may divide a circuit design (or circuit layers thereof) into three sets of geometric elements, each of which may then be used to form a respective complementary lithographic mask pattern. Such a patterning process may be referred to a "triple-patterning." The use of two, three, four, or even more complementary masks and coloring of multiple sets of geometric elements in layout design data can generally be referred to as multiple patterning or multi-patterning EDA processes.

The disclosure herein also refers to quantum computing. Quantum computing may refer to non-classical computation models that can represent quantum bits (or qubits) via quantum superpositions of possible states. Quantum computing systems may instantiate, process, configure, and process quantum computing models by leveraging quantum mechanical phenomena to manipulate qubits into different possible states. Example forms of quantum computing include quantum annealing and adiabatic quantum computations. Quantum annealing, for example, may apply quantum computing to determine a global minimum of a given objective function over a given set of candidate solutions (e.g., states in a quantum computing model), doing so via quantum fluctuations or other techniques. Developments in quantum computing are continuing, with the potential to transform computational capabilities in various different fields.

One field in which quantum computing may potentially yield benefit is in computations of EDA processes, many of which can be NP-hard problems including multi-patterning. Application of quantum computing to EDA processes, however, may present challenges to properly, efficiently, and accurately map, represent, and perform EDA computations via quantum computing. Current limitations in quantum computing systems (e.g., mapping to EDA processes, limited data precision, etc.) may further limit the effectiveness in applications of quantum computing to EDA processes.

The features described herein may support limited basis quantum particle definitions in applications of quantum computing to EDA processes. In particular, the various limited basis quantum particle definition features described herein may provide capabilities to represent particles, qubits, or other data primitives in a quantum computing model to improve the accuracy, precision, or effectiveness at which the quantum computing model represents a corresponding EDA process, which may consequently improve quantum computing applications to perform such EDA processes for circuit designs.

In some examples, the limited basis quantum particle definition features may define particles in a quantum computing model to restrict, reduce, or altogether eliminate non-physical states in the quantum computing model. Non-physical states may represent states of the quantum computing model that cannot occur in a corresponding EDA process or are prohibited by a solution, output, parameter, or configuration of the mapped EDA process. Defining a quantum particle to itself prohibit non-physical states (e.g., states that violate a solution requirement for an EDA process) may improve quantum computing applications to EDA processes even without (e.g., independent of) particle interactions and ground state computations via a quantum computing system. Such limited basis definitions may improve the accuracy of mapping of EDA processes to quantum computing systems and result in quantum computing outputs for EDA processes with increased accuracy. As such, the limited basis quantum particle definition features described herein may effectively and efficiently improve mapping of EDA processes to quantum computing systems and applications of quantum computing to performing EDA processes.

These and other limited basis quantum particle definition features and technical benefits are described in greater detail herein.

Figure 1:
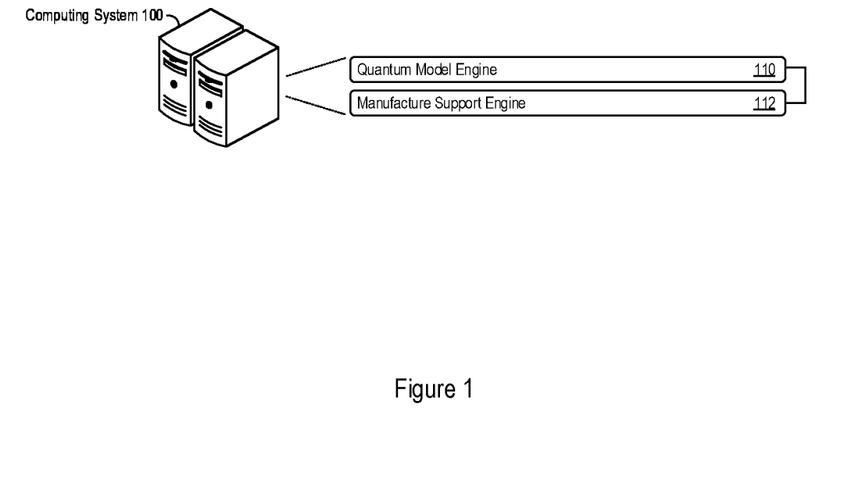
FIG. 1 shows an example of a computing system that supports limited basis quantum particle definitions in EDA processes.

FIG. 1 shows an example of a computing system 100 that supports limited basis quantum particle definitions in EDA processes. The computing system 100 may include a single or multiple computing devices such as application servers, compute nodes, data servers, desktop or laptop computers, cloud computing resources, smart phones or other mobile devices, tablet devices, embedded controllers, and more. In some implementations, the computing system 100 may takes the form of a quantum computing system that supports any number of quantum computing techniques, such as quantum annealing, adiabatic quantum computations, or others.

As described in greater detail herein, the computing system 100 may configure, form, generate, or otherwise process quantum computing models to perform EDA processes, such as multi-patterning. In that regard, the computing system 100 may generate quantum computing models that can represent or process states of a quantum system comprising particles, interaction parameters, and other characteristics to model and perform any number of corresponding EDA processes. In doing so, the computing system 100 may define particles in the quantum computing model with a limited basis in that the particle definitions themselves may limit or suppress non-physical states in the quantum computing model that cannot occur (e.g., cannot be a solution) for the EDA processes.

For multi-patterning EDA processes, the computing system 100 may generate a quantum computing model with multiple particle types in which different particle types correspond to different colors in the multi-patterning. Particle locations in the quantum computing model (e.g., model sites) may correspond to different geometric elements in a circuit layer. In such examples, the computing system 100 may define quantum particle types with a limited basis such that no two particles can occupy the same model site, which may thus suppress a non-physical state in which a geometric element of a circuit design is colored with two colors. Any number of additional or alternative limited basis quantum particle definitions for EDA processes are contemplated, many of which are further described herein.

To implement any of the various features described herein, the computing system 100 may include a quantum model engine 110 and a manufacture support engine 112. The computing system 100 may implement the quantum model engine 110 and manufacture support engine 112 (and components thereof) in various ways, for example as hardware and programming implemented via local resources of the computing system 100. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engine components or system elements using the same computing system features or hardware components (e.g., a common processor or common storage medium for the quantum model engine 110 and the manufacture support engine 112).

In operation, the quantum model engine 110 may form a quantum computing model to represent an EDA process for a circuit design, such as a multi-patterning process to assign colors to geometric elements of the circuit design. In some examples, the quantum computing model may include model sites that correspond to the geometric elements of the circuit design and quantum particle types that correspond to given colors in the multi-patterning process. In some examples, the quantum computing model may include quantum particle types defined to prohibit any number of non-physical states in the quantum computing model from occurring. In operation, the quantum model engine 110 may also generate a color assignment for the geometric elements of the circuit design through the quantum computing model.

In operation, the manufacture support engine 112 may use the color assignment to support manufacture of circuit layers of the circuit design through multiple manufacturing steps. For example, the manufacture support engine 112 may do so by sending the color assignment to other system components to control generation of complementary lithographic masks for use in manufacturing circuit layers of the circuit design through multiple lithography steps. The color assignment may be "colored" in that it represents an explicit coloring of geometric elements of a circuit design or it may be "colorless" in indicating that coloring solution for a multi-patterning process on a circuit design exists (or conversely, does not exist). The manufacture support engine 112 may use (e.g., send) color assignments whether in a colored form or a colorless form to support manufacture of circuit designs.

These and other example limited basis quantum particle definition features according to the present disclosure are described in greater detail next. Many of the examples presented herein are provided with respect to multi-patterning EDA processes. However, the limited basis quantum particle definition features described herein may be consistently applied for any number of additional or alternative EDA processes, such as design-rule-check (DRC) processes, optical proximity correction (OPC) processes, design-for-manufacture (DFM), and many more.

Figure 2:
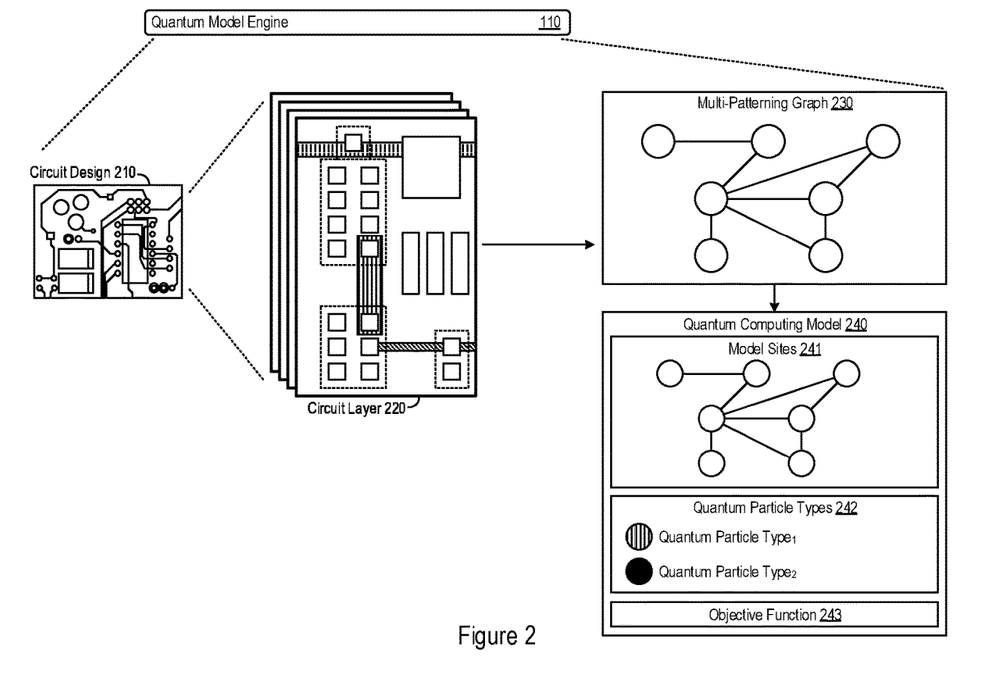
FIG. 2 shows an example generation of a quantum computing model by a quantum model engine to support application of quantum computing to a multi-patterning process.

FIG. 2 shows an example generation of a quantum computing model by a quantum model engine 110 to support application of quantum computing to a multi-patterning process. In doing so, the quantum model engine 110 may access a circuit design, which may include multiple circuit layers to color via multi-patterning. In the example shown in FIG. 2, the quantum model engine 110 accesses the circuit design 210 which includes the circuit layer 220.

The quantum model engine 110 may construct a multi-patterning graph for a given layer of a circuit design, such as the multi-patterning graph 230 constructed for the circuit layer 220. To generate the multi-patterning graph 230, the quantum model engine 110 may represent geometric elements in the circuit layer 220 as nodes and any color constraints between geometric elements of the circuit layer 220 as edges, for example according to any number of modern multi-patterning graph generation techniques and methodologies.

In supporting applications of quantum computing to EDA processes, the quantum model engine 110 may generate a quantum computing model, e.g., by loading or instantiating a previously generated quantum computing model with any of the parameters, characteristics, or features described herein. In some instances, the quantum model engine 110 may map a multi-patterning EDA process to a quantum computing system. The quantum model engine 110 may generate (e.g., load or instantiate) a quantum computing model with quantum particles and interaction parameters that map to a given multi-patterning process or other EDA process. In some examples, the quantum model engine 110 may do so by mapping the multi-patterning graph 230 to a quantum computing model 240. The quantum computing model 240 may include model sites 241 that represent locations in the quantum computing model 240 that quantum particles of the quantum computing model 240 can occupy. Each given model site among the model sites 241 may correspond to a particular geometric element of a circuit layer 220 (and thus, a given node in the multi-patterning graph 230).

The quantum model engine 110 may generate a quantum computing model 240 that defines any number of quantum particle types 242, and the number of different quantum particle types may depend on the number of colors used for the multi-patterning process (e.g., double-patterning processes, triple-patterning processes, etc.). As described herein, the quantum particle types 242 may further define characteristics, properties, or parameters of the quantum particles, and may thus provide a basis in the definition of the various quantum particle types that exist in the quantum computing model 240. The quantum computing model 240 generated by the quantum model engine 110 may also include an objective function 243 through which the quantum model engine 110 may evaluate states in the quantum computing model 240 and perform the multi-patterning EDA process via quantum computing.

The specific form of the quantum computing model 240 generated (e.g., loaded) by the quantum model engine 110 may vary based on the type of quantum computing techniques to be applied, capabilities (or limitations) of a given quantum computing system, or various other quantum-specific factors. For instance, the quantum model engine 110 may generate the quantum computing model 240 (or components thereof) in a manner or form specifically suited for quantum annealing, adiabatic quantum algorithms, and the like.

To illustrate, the quantum model engine 110 may represent the multi-patterning graph 230 (whether expressly or logically) as a graph $\mathcal{G}(\mathcal{V}, \mathcal{E})$ with n number of nodes or vertices $\mathcal{V} = \{v_1, \ldots, v_n\}$, m number of edges $\mathcal{E} = \{e_1, \ldots, e_m\}$, and k number of colors $\mathcal{C} = \{c_1, \ldots, c_k\}$. In such examples, k=2 for a double-patterning process, k=3 for a triple-patterning process, etc. For such a graph $\mathcal{G}(\mathcal{V}, \mathcal{E})$ the quantum model engine 110 may represent an adjacency matrix a, in which $a_{ij}$, and where $i,j \in \{1, \ldots, n\}$. For each cell $a_{ij}$ of the adjacency matrix a:

$$a_{ij} = \begin{cases} 1 & \text{if there's an edge between } v_i \text{ and } v_j \\ 0 & \text{otherwise} \end{cases}$$

In some examples, the quantum model engine 110 may also determine or identify a degree d of a given node as the sum of the cell values of a given row or column corresponding to the node, e.g., as $d_i = \Sigma_j a_{ij}$.

For multi-patterning EDA processes, the quantum model engine 110 may perform a coloring process by associating a color c with each node, e.g., in which $x_i^{(c)}$, $i \in \mathcal{V}$. In doing so, the quantum model engine 110 may define a set of indicator functions as follows:

$$\forall_i f_{ij_1} = \begin{cases} a_{ij_1} & \text{if } x_i^{(c)} \neq x_{j_1}^{(c)} \\ 0 & \text{otherwise} \end{cases}$$

$$\vdots$$

$$\forall_i f_{ij_1 j_2 \cdots j_t} = \begin{cases} a_{ij_1} a_{j_1 j_2} \cdots a_{j_{t-1} j_t} & \text{if } x_i^{(c)} \neq \ldots \neq x_{j_t}^{(c)} \\ 0 & \text{otherwise} \end{cases}$$

Through these indicator functions, the quantum model engine 110 may represent the objective of the multi-patterning EDA process as follows: to assign $v_i$, $i \in \mathcal{V}$, a value from the set $\mathcal{C}$ (e.g., a color) such that, for given (relatively small) integers t and k, the initial t−1 conditions of the set of indicator functions may or may not hold, but ensure that the $t^{th}$ condition of the indicator functions must hold. That is, the quantum model engine 110 may express the objective of such a constrained coloring or multi-patterning process to maximize the following cost function:

$$\sum_{i j_1 j_2 \cdots j_t} f_{ij_1 j_2 \cdots j_t}$$

While the cost function above may provide one representation to perform a multi-patterning process, such a cost function may be inapplicable to, incompatible with, or unsupported by various quantum computing systems. As such, the quantum model engine 110 may transform the above cost function (or any other cost function representative of an EDA process) into a form supported via quantum computing.

In some examples, the quantum model engine 110 may transform cost functions of EDA processes into a form supported by adiabatic quantum algorithms or quantum annealing. Examples of function forms supported by quantum computing systems include stoquastic Hamiltonians or Quadratic Unconstrained Binary Optimization (QUBO) problems, such as QUBO cost functions in the following form:

$$C(x) = C(x_1, \ldots, x_N) = \sum_i h_i x_i + \sum_{i,j} J_{i,j} x_i x_j$$

In the QUBO cost function C(x) above, the terms $h_i$, $J_{i,j}$ may represent real coefficients and $x \in \{0,1\}^n$ may represent a vector of binary-valued variables. As such, the quantum model engine 110 may map a multi-patterning cost function (or any other cost function for other EDA processes) to a QUBO form in order to solve or perform the EDA process via quantum annealing. As a particular example, the quantum model engine 110 may represent the cost function of a multi-patterning or other EDA process in a Hamiltonian matrix in Ising form, e.g., as the following:

$$E_{Ising}(s_1, \ldots, s_N) = \sum_i^N h'_i s_i + \sum_{i(i,j) \in \varepsilon} J'_{i,j} s_i s_j$$

where $s_i = \pm 1$. The quantum model engine 110 may use a mapping of $s_j = 2x_j - 1$ to relate an Ising Hamiltonian to the form of the QUBO cost function $C(x)$ described herein. The QUBO form (or Hamiltonian Ising) may be the form of the objective function 243 generated by the quantum model engine 110 to model a corresponding multi-patterning process.

By mapping a multi-patterning or other EDA process to a quantum computing model, the quantum model engine 110 may support application of quantum computing (e.g., quantum annealing) to EDA processes. In using quantum computing to solve Ising problems (and thus perform EDA processes), the quantum model engine 110 may support adiabatic quantum optimizations or quantum annealing. In such examples, the quantum model engine 110 may perform the EDA process (e.g., determine a color assignment for a multi-patterning process) as the solution of a combinatorial problem that can be encoded in ground state of a Hamiltonian $H_C$. The quantum model engine 110 may construct a time-dependent Hamiltonian $H = (1-s)H_B + s\, H_C$, in which $s = t/t_f$, $t_f$ is a total evolution time (which can be a tunable parameter), and $H_B$ is a Hamiltonian with a ground state that defines the initial state of a quantum system defined by the quantum computing model. The quantum model engine 110 may start from $s=0$ and adiabatically evolve the quantum system to the final state $H_C$, where $s=1$, with a sufficiently large value of $t_f$. For any Ising Hamiltonian or quantum annealing problem, the quantum model engine 110 may generate the quantum computing model 240 to identify three components $H_B$, $H_C$ and evolution path.

In some examples, the ground state of the quantum system may be identified by the quantum model engine 110 as a state of the quantum system with a minimum cost value for the quantum computing model, e.g., as specified through the objective function 243 in a QUBO form. That is, the objective function 243 may specify a cost value for a given state of the quantum computing model 240, and adiabatic evolution of the quantum system may identify different system states with different cost values as measured through the objective function 243. By determining the ground state via the quantum computing model 240 (and the quantum system defined by the quantum computing model 240), the quantum model engine 110 may apply quantum computing techniques to perform EDA processes such as multi-patterning.

To further illustrate, the quantum model engine 110 may map a double-patterning EDA process to a quantum computing system that supports quantum annealing or adiabatic quantum optimizations. In a double-patterning process, a multi-patterning graph 230 may include n number of nodes, and the quantum model engine 110 may generate a quantum computing model 240 to include n binary variables representative of the model sites 241. For the n binary variables, the quantum model engine 110 may represent a given binary variable as $x_i^{(0)}$, where $x_i^{(0)} = 0$ means that vertex i is colored with a first color, and $x_i^{(0)} = 1$ means the vertex i is colored with a second color. In such an example, each color may be represented in the quantum computing model 240 as different quantum particle types, such as a quantum particle types$_1$ and a quantum particle type$_2$ as defined in the quantum particle types 242 of the quantum computing model 240. For such a double-patterning process, the quantum model engine 110 may determine the objective function 243 in a QUBO form, e.g., as the following:

$$\hat{C}_2^{(1)}(x) = \sum_{i=1}^n \left[ \beta_1 \sum_{j_1} x_i^{(0)} x_{j_1}^{(0)} a_{ij_1} + \sum_j (1 - x_i^{(0)})(1 - x_{j_1}^{(0)}) a_{ij_1} \right]$$

in which $\beta_1$ is a tunable penalty parameter.

In effect, such an objective function 243 may specify interaction parameters in a quantum system such that when two model sites in in the quantum system are interconnected and both occupied by a first quantum particle type (e.g., when two corresponding vertices of the multi-patterning graph 230 are connected by an edge and are assigned a first of the two colors, i.e., a bit value of 0), the second term in the objective function 243 incurs a penalty. When two model sites in in the quantum system are interconnected and both occupied by a second quantum particle type (e.g., when two corresponding vertices of the multi-patterning graph 230 are connected by an edge and are assigned a second of the two colors, i.e., a bit value of 1), the first term of the objective function 243 incurs penalty. Both such terms of the objective function 243 may act to disincentivize bit flips (e.g., changes in particles) that result in monochromatic edges. Accordingly, such an objective function 243 may ultimately have the effect of identifying a ground state in which constrained geometric elements in a circuit layer are not assigned the same color in a multi-patterning process (or to an optimal degree for circuit designs in which a perfect multi-patterning solution does not exist).

In the double-patterning illustration presented herein and any other corresponding quantum computing models, the quantum model engine 110 may define quantum particles and quantum particle types with a limited basis to suppress non-physical states of the quantum system. Non-physical states of a quantum computing model may refer to corresponding states of the EDA process that are impossible, inaccurate, inapplicable, or violate a solution requirement of the EDA process. As one multi-patterning example, the quantum model engine 110 may define the quantum particle types 242 to prohibit a non-physical state of the quantum computing model in which two quantum particles occupy a same model site. This may be a state that cannot occur in a(n optimal) solution or output of a multi-patterning process, as a particular geometric element in a circuit layer cannot be colored with two or more colors. Accordingly, the quantum model engine 110 may define the quantum particle types 242 with an exclusionary principle similar to electron atom states in which no two electrons can occupy the same location in the atomic system.

As another multi-patterning example, the quantum model engine 110 may define a limited basis definition for quantum particle types of a quantum computing model 240 by specifying that no given model site among the model sites 241 is void (e.g., without a quantum particle occupying the model site). That is, in some examples, non-physical states prohibited by definition of the quantum particle types 242 include those in which a quantum particle does not occupy a model site. In some quantum computing models generated for multi-patterning EDA processes, the correspondence of colors to quantum particle types may be at least 1:1 ratio, in that each color of the multi-patterning process is represented by at least one quantum particle type of the quantum computing model. A state of such a quantum system in which a model site is not occupied by any quantum particle (e.g., is void) would represent a multi-patterning color assignment in which a given geometric element corresponding to the model site is not assigned a color.

Since such a color assignment would represent an erroneous or incorrect output for the multi-patterning process or violate a solution requirement for the multi-patterning process, the quantum model engine 110 may suppress or prohibit corresponding non-physical states from the quantum computing model via expressly setting such a limitation in the quantum particle definitions. Put another way, the quantum model engine 110 may prohibit non-physical states via limited basis quantum particle definitions that would effectively violate EDA process solution requirements of a mapped EDA process. Accordingly, the quantum model engine 110 may define quantum particle types to suppress a non-physical state that results in an EDA process violation, such as a multi-patterning violation in which a geometric element in the circuit layer is not assigned any color.

With a generated quantum computing model, the quantum model engine 110 may apply quantum computing to perform an EDA process. In some examples, the quantum model engine 110 may apply quantum annealing or adiabatic quantum optimizations to determine a ground state of the quantum computing model 240 (and represented quantum system). The ground state may represent a solution or output of the EDA process, determined through mapping the EDA process to a quantum computing system. For a multi-patterning EDA process, a determined ground state from the quantum computing model may include quantum particles (corresponding to multi-patterning colors) at specific model sites (corresponding to geometric elements of a circuit design). As such, a computed ground state may represent a color assignment to apply to geometric elements of a circuit design. In determining the color assignment, the limited basis quantum particle definitions may reduce or eliminate consideration of states that could not be part of the solution (and thus color assignment) to the multi-patterning process.

By utilizing limited basis quantum particle definitions to suppress, limit, reduce, or eliminate non-physical states, the quantum model engine 110 may reduce the reliance on, use of, or impact by penalty parameters in a quantum computing model (e.g., as introduced or implemented into an objective function). Modern quantum computing systems can have limited data precision, and using increasingly large penalty parameters in objective functions to avoid, limit, or suppress non-physical states can result in precision loss and inaccurate results (e.g., being unable to distinguish between a true ground state of the quantum system as opposed to local minima, and thus unable to find an optimal solution to a mapped EDA process). Through use of limited basis quantum particle definitions to eliminate or limit non-physical states, quantum computing models generated by the quantum model engine 110 may support use of less or lower valued penalty parameters, and thus result in increased precision and accuracy of quantum computing results for EDA processes.

The specific limited basis definitions applied by the quantum model engine 110 may differ depending on how a quantum computing model represents colors of a multi-patterning process. In FIG. 2, the quantum computing model 240 may expressly define two different quantum particle types, quantum particle type$_1$ and quantum particle type$_2$, each of which may correspond to a different color in a double-patterning process. In other examples, the quantum model engine 110 may define only a single quantum particle type in a quantum computing model and allow quantum system states in which model sites are void. In these examples, void model sites may represent a second color in the double-patterning process. Such an example is described next in connection with FIG. 3.

Figure 3:
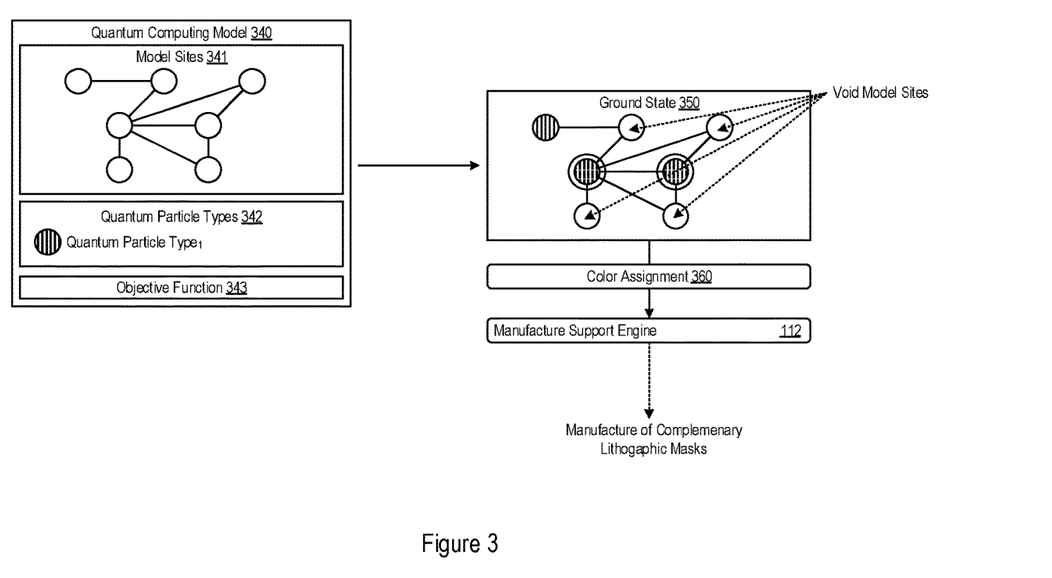
FIG. 3 shows an example application of quantum computing to determine a color assignment for a double-patterning EDA process.

FIG. 3 shows an example application of quantum computing to determine a color assignment for a double-patterning EDA process. In FIG. 3, the quantum model engine 110 generates the quantum computing model 340 for a double-patterning EDA process, which may include model sites 341 of a quantum system corresponding to geometric elements of a circuit design, quantum particle types 342 (which may include limited basis quantum particle definitions), and an objective function 343, e.g., in a QUBO form as described herein and mapped for the double-patterning EDA process.

The quantum model engine 110 may generate the quantum computing model 340 such that only one quantum particle type exists in the quantum system of the quantum computing model 340, e.g., quantum particle type$_1$ shown in the quantum particle types 342 of FIG. 3. For a given state of the quantum computing model 340, a given model site not occupied by a quantum particle of quantum particle type$_1$ may correspond to a first color in the double-patterning EDA process and a given model site occupied by a quantum particle of quantum particle type$_1$ may correspond to a second color in the double-patterning EDA process. As such, the quantum model engine 110 may generate a quantum computing model 340 to include only a single quantum particle type for a double-patterning EDA process, thus limiting the definition of the quantum system to a sole quantum particle type for the double-patterning EDA process. In doing so, the quantum model engine 110 may leverage states of the quantum system in which model sites are void (not occupied by a quantum particle) and define interaction parameters to penalize linked model sites as both being void or both being occupied by a respective quantum particle.

Note that in the quantum computing model 340 example in FIG. 3, the quantum model engine 110 need not limit the definition of quantum particle type$_1$ to suppress or prohibit states in which a model site is void. In that regard, the void model sites would not represent a non-physical state for the particular quantum computing model 340 generated in FIG. 3, and such quantum system states would not be expressly limited via quantum particle definition by the quantum model engine 110. In contrast, for other configurations of quantum computing models that expressly represent each color of a double-patterning EDA process with at least one quantum particle type respectively, states with void model sites may instead be suppressed or limited via quantum particle definitions (e.g., as described above in connection with FIG. 2). Accordingly, limited basis quantum particle definitions may vary based on configurations of various quantum systems and corresponding quantum computing models used for multi-patterning processes.

Continuing the discussion with respect to FIG. 3, the quantum model engine 110 may determine a ground state 350 for the quantum computing model 340 via the objective function 343 (e.g., via quantum annealing). From the ground state 350, the quantum model engine 110 may determine a color assignment for geometric elements of a circuit design through the quantum computing model 340. The manufacture support engine 112 may use the color assignment 360 to support manufacture of circuit layers of the circuit design through multiple manufacturing steps. For example, the manufacture support engine 112 may do so by sending the color assignment 360 to other system components to control generation of complementary lithographic masks for use in manufacturing circuit layers of the circuit design through multiple lithography steps.

Figure 4:
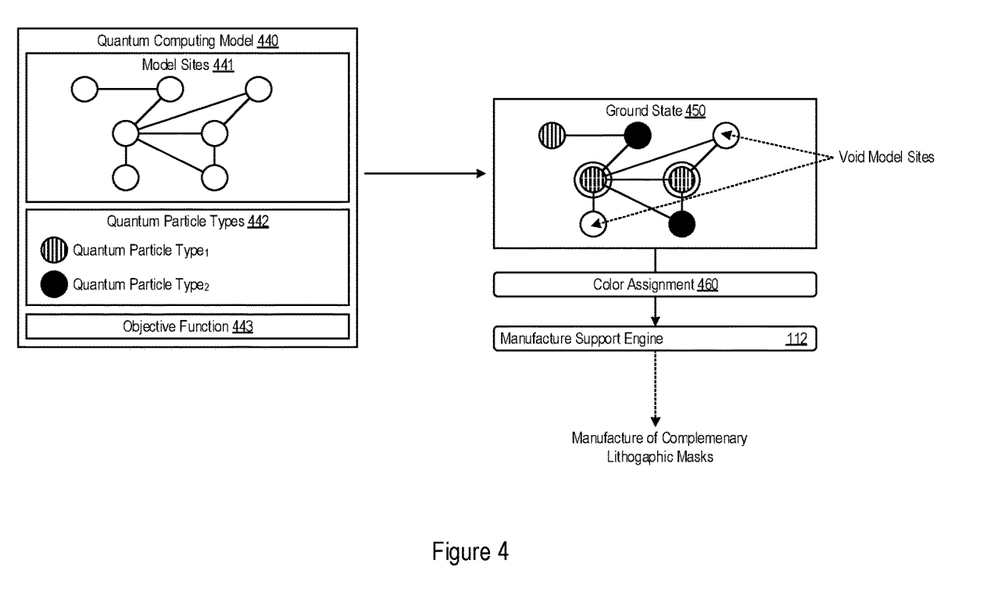
FIG. 4 shows an example application of quantum computing to determine a color assignment for a triple-patterning EDA process.

FIG. 4 shows an example application of quantum computing to determine a color assignment for a triple-patterning EDA process. In FIG. 4, the quantum model engine 110 generates the quantum computing model 440 for a triple-patterning EDA process, which may include model sites 441 of a quantum system corresponding to geometric elements of a circuit design, quantum particle types 442 (which may include limited basis quantum particle definitions), and an objective function 443, e.g., in a QUBO form as described herein and mapped for the triple-patterning EDA process.

The quantum model engine 110 may generate the quantum computing model 440 such that only two quantum particle types exist in the quantum system of the quantum computing model 440, e.g., quantum particle type$_1$ and quantum particle type$_2$ shown in the quantum particle types 442 of FIG. 4. For a given state of the quantum computing model 440, a given model site occupied by a quantum particle of quantum particle type$_1$ may correspond to a first color in the triple-patterning EDA process, a given model site occupied by a quantum particle of quantum particle type$_2$ may correspond to a second color in the triple-patterning EDA process, and a model site not occupied by a quantum particle may correspond to a third color in the triple-patterning process. As such, the quantum model engine 110 may generate a quantum computing model 440 to include only two quantum particle type for a triple-patterning EDA process with three colors, thus limiting the definition of the quantum system and the two quantum particle types for the triple-patterning EDA process. In doing so, the quantum model engine 110 may leverage states of the quantum system in which model sites are void (not occupied by a quantum particle) and define interaction parameters to penalize linked model sites as both being void or both being occupied by the same quantum particle type.

In FIG. 4, the quantum model engine 110 may determine a ground state 450 for the quantum computing model 440 via the objective function 443. From the ground state 450, the quantum model engine 110 may determine a color assignment for geometric elements of a circuit design through the quantum computing model 440. The manufacture support engine 112 may use the color assignment 460 to support manufacture of the circuit layers of the circuit design through multiple manufacturing steps, e.g., for manufacture of three complementary lithographic masks with geometric elements masked according to the color assignment 460.

Figure 5:
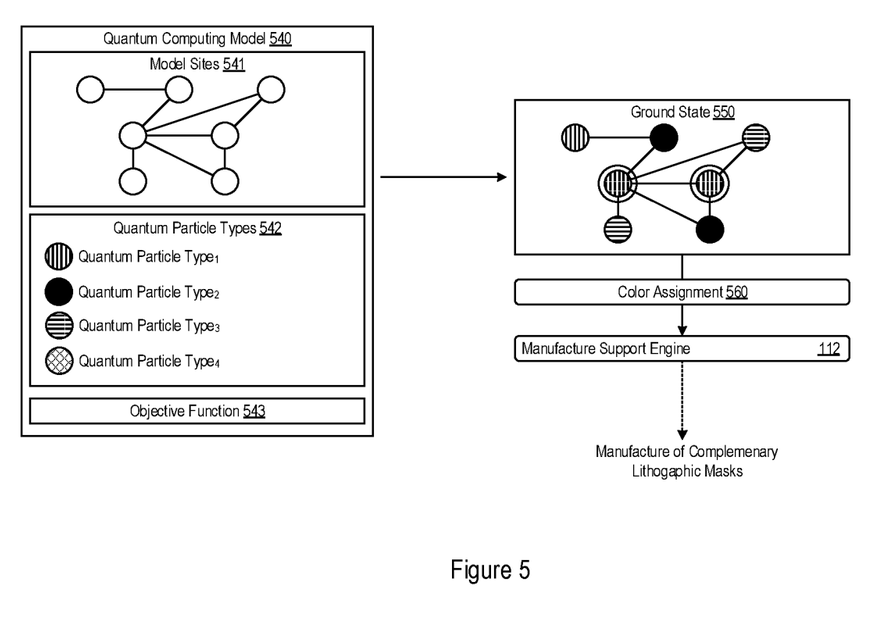
FIG. 5 shows another example application of quantum computing to determine a color assignment for a triple-patterning EDA process.

FIG. 5 shows another example application of quantum computing to determine a color assignment for a triple-patterning EDA process. In FIG. 5, the quantum model engine 110 generates the quantum computing model 540 for a triple-patterning EDA process, which may include model sites 541 of a quantum system corresponding to geometric elements of a circuit design, quantum particle types 542 (which may include limited basis quantum particle definitions), and an objective function 543, e.g., in a QUBO form as described herein and mapped for the triple-patterning EDA process.

The quantum model engine 110 may generate the quantum computing model 540 such that four quantum particle types exist in the quantum system of the quantum computing model 540, e.g., quantum particle type$_1$, quantum particle type$_2$, quantum particle type$_3$, and quantum particle type$_4$ shown in the quantum particle types 542 of FIG. 5. For a given state of the quantum computing model 540, a given model site occupied by a quantum particle of quantum particle type$_1$ may correspond to a first color in the triple-patterning EDA process, a given model site occupied by a quantum particle of quantum particle type$_2$ may correspond to a second color in the triple-patterning EDA process, and a model site occupied by a quantum particle of quantum particle type$_3$ may correspond to a third color in the triple-patterning process. The quantum model engine 110 may further generate the quantum computing model 540 by setting a penalty parameter to disincentivize a given model site from being occupied by a quantum particle of quantum particle type$_4$.

To illustrate, for the application of quantum computing to a triple-patterning EDA process as described in FIG. 5 with n number of geometric elements (and thus n number of nodes in a multi-patterning graph and n number of model sites 541), the quantum model engine 110 may set 2*n binary variables applicable to each geometric element, multi-patterning graph node, or model set. The 2*n binary variables may be represented $\{x_i^{(0)}, x_i^{(1)}\}$, where a color assigned to a given geometric element is expressed as $2x_i^{(0)} + x_i^{(1)}$. For such a triple-patterning EDA process, the quantum model engine 110 may represent a cost function in a Polynomial Unconstrained Binary Optimization (PUBO) form as the following:

$$\hat{C}_3^{(1)}(x) = \sum_{i=1}^{n} \left[ \beta_1 \sum_{j_1} x_i^{(0)} x_{j_1}^{(0)} a_{ij_1} + \beta_2 \sum_{j_1} x_i^{(1)} x_{j_1}^{(1)} a_{ij_1} + \beta_3 \sum_{j_1} (1 - x_i^{(0)})(1 - x_{j_1}^{(0)}) \right.$$
$$\left. (1 - x_i^{(1)})(1 - x_{j_1}^{(1)}) a_{ij_1} + \sum_{j_1} (1 + x_i^{(0)})(1 + x_{j_1}^{(0)}) x_i^{(1)} x_{j_1}^{(1)} a_{ij_1} \right]$$

where $\beta = \{\beta_1, \ldots, \beta_3\}$ are penalty parameters tunable by the quantum model engine 110. Expressed in terms of components of a multi-patterning graph, when two nodes connected by an edge are assigned a first color, i.e., $x_i^{(0)} = x_i^{(1)} = x_{j_1}^{(0)} = x_{j_1}^{(1)} = 0$, the third term of the PUBO cost function incurs a penalty; when assigned a second color, i.e. $x_i^{(0)} = 1$, $x_i^{(1)} = 0$, $x_{j_1}^{(0)} = 1$, $x_{j_1}^{(1)} = 0$, the first term of the PUB cost function incurs a penalty; when assigned the third color, i.e., $x_i^{(0)} = 0$, $x_i^{(1)} = 1$, $x_{j_1}^{(0)} = 0$, $x_{j_1}^{(1)} = 1$, the second term of the PUBO cost function incurs a penalty; when assigned the fourth color, i.e., $x_i^{(0)} = x_i^{(1)} = x_{j_1}^{(0)} = x_{j_1}^{(1)} = 1$, each of the first, second, and fourth terms of the PUBO cost function incur penalties.

Accordingly, the quantum model engine 110 may represent a PUBO cost function for the triple-patterning EDA process to reduce assignments of the fourth color, and thus disincentivize a given model site in a quantum computing model from being occupied by a quantum particle of quantum particle type$_4$ (corresponding to the fourth color). Table 1 below further describes the penalty terms of the PUBO form.

TABLE 1

Different Penalty Terms to Disincentivize Use of a Fourth Color (Color 3) in a Triple-Patterning EDA Process

| $x_i^{(0)}$ | $x_i^{(1)}$ | $x_{j_1}^{(0)}$ | $x_{j_1}^{(1)}$ | Color (node i) | Color (node $j_i$) | Penalty |
|---|---|---|---|---|---|---|
| 0 | 0 | 0 | 0 | 0 | 0 | 3 |
| 0 | 1 | 0 | 1 | 1 | 1 | 2 |
| 1 | 0 | 1 | 0 | 2 | 2 | 1 |

TABLE 1-continued

Different Penalty Terms to Disincentivize Use of a
Fourth Color (Color 3) in a Triple-Patterning EDA Process

| $x_i^{(0)}$ | $x_i^{(1)}$ | $x_{j_1}^{(0)}$ | $x_{j_1}^{(1)}$ | Color (node i) | Color (node $j_1$) | Penalty |
|---|---|---|---|---|---|---|
| 1 | 1 | 1 | 1 | 3 | 3 | 1, 2, 4 |
| 0 | 0 | 0 | 1 | 0 | 1 | — |
| 0 | 0 | 1 | 0 | 0 | 2 | — |
| 0 | 0 | 1 | 1 | 0 | 3 | — |
| 0 | 1 | 0 | 0 | 1 | 0 | — |
| 0 | 1 | 1 | 0 | 1 | 2 | — |
| 0 | 1 | 1 | 1 | 1 | 3 | 2, 4 |
| 1 | 0 | 0 | 0 | 2 | 0 | — |
| 1 | 0 | 0 | 1 | 2 | 1 | — |
| 1 | 0 | 1 | 1 | 2 | 3 | 1 |
| 1 | 1 | 0 | 0 | 3 | 0 | — |
| 1 | 1 | 0 | 1 | 3 | 1 | 2, 4 |
| 1 | 1 | 1 | 0 | 3 | 2 | 1 |

The quantum model engine 110 may decompose the PUBO form of a cost function into a suitable QUBO form to support application of quantum annealing or adiabatic quantum optimizations to a multi-patterning EDA process. Penalty terms in the PUBO form may be retained as the PUBO form is decomposed by the quantum model engine 110 into a QUBO form applicable to quantum computing systems. The QUBO form decomposed from the PUBO form may be set by the quantum model engine 110 as the objective function 543 for the quantum computing model 540, from which the quantum model engine 110 may determine a ground state solution to a multi-patterning EDA process.

In FIG. 5, the quantum model engine 110 may determine a ground state 550 for the quantum computing model 540 via the objective function 543. From the ground state 550, the quantum model engine 110 may determine a color assignment 560 for geometric elements of a circuit design through the quantum computing model 540. The manufacture support engine 112 may use the color assignment 560 to support manufacture of circuit layers of the circuit design through multiple manufacturing steps, e.g., for manufacture of three complementary lithographic masks with geometric elements masked according to the color assignment 560.

In the various ways described herein, computing systems may support limited basis quantum particle definitions for applications of quantum computing to EDA processes. While some of the examples described herein are in the context of double-patterning and triple-patterning EDA processes, any of the features described herein may be consistently implement for any type of multi-patterning process, including quadruple-patterning processes, quintuple patterning processes, etc. Any of the features described herein may be implemented individually or in combination with any of the features described in U.S. patent application Ser. No. 16/688,028, filed by Mentor Graphics Corporation on Nov. 19, 2019, and titled "ADAPTIVE PENALTY TERM DETERMINATIONS IN APPLICATIONS OF QUANTUM COMPUTING TO ELECTRONIC DESIGN AUTOMATION PROCESSES", the entirety of which is incorporated by reference herein. For instance, the quantum model engine 110 may implement, provide, or support any of the adaptive penalty term determination features described therein by the incorporated reference, any of the limited basis quantum particle definition features described herein by the present disclosure, or any combinations of both.

Figure 6:
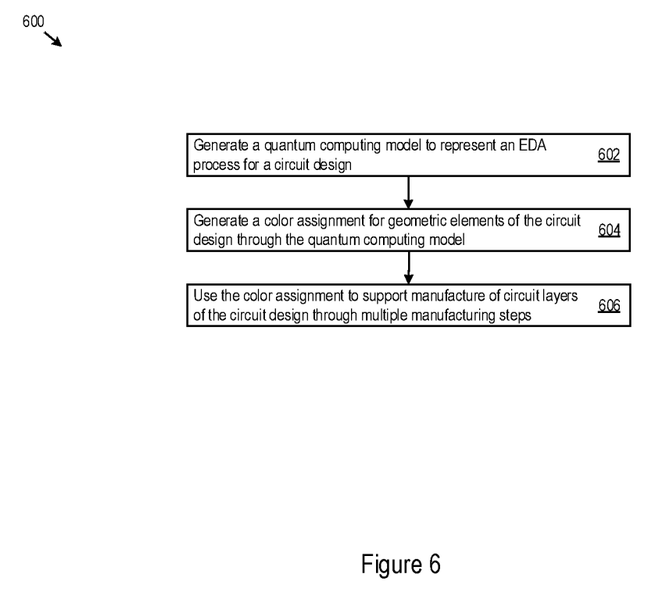
FIG. 6 shows an example of logic that a system may implement to support limited basis quantum particle definitions in EDA processes.

FIG. 6 shows an example of logic 600 that a system may implement to support limited basis quantum particle definitions in EDA processes. In some examples, the computing system 100 may implement the logic 600 as hardware, executable instructions stored on a machine-readable medium, or as a combination of both. The computing system 100 may implement the logic 600 via the quantum model engine 110 and the manufacture support engine 112, for example, through which the computing system 100 may perform or execute the logic 600 as a method to support limited basis quantum particle definitions in EDA processes. However, other implementation options are possible.

In implementing the logic 600, the quantum model engine 110 may generate a quantum computing model to represent an EDA process (602), and the EDA process may be a multi-patterning process to assign colors to geometric elements of the circuit design. The quantum computing model generated by the quantum model engine 110 may include model sites that correspond to the geometric elements of the circuit design and quantum particle types that corresponds to given colors in the multi-patterning process. The quantum particle type may be defined to prohibit non-physical states in the quantum computing model from occurring. In implementing the logic 600, the quantum model engine 110 may also generate a color assignment for the geometric elements of the circuit design through the quantum computing model (604). In implementing the logic 600, the manufacture support engine 112 may use the color assignment to support manufacture of circuit layers of the circuit design through multiple manufacturing steps (606).

While example features are shown and described through FIG. 6, the logic 600 may include any number of additional or alternative steps as well. The logic 600 may additionally or alternatively implement any other features described herein, for example any number of features with respect to the quantum model engine 110, manufacture support engine 112, or combinations of both.

Figure 7:
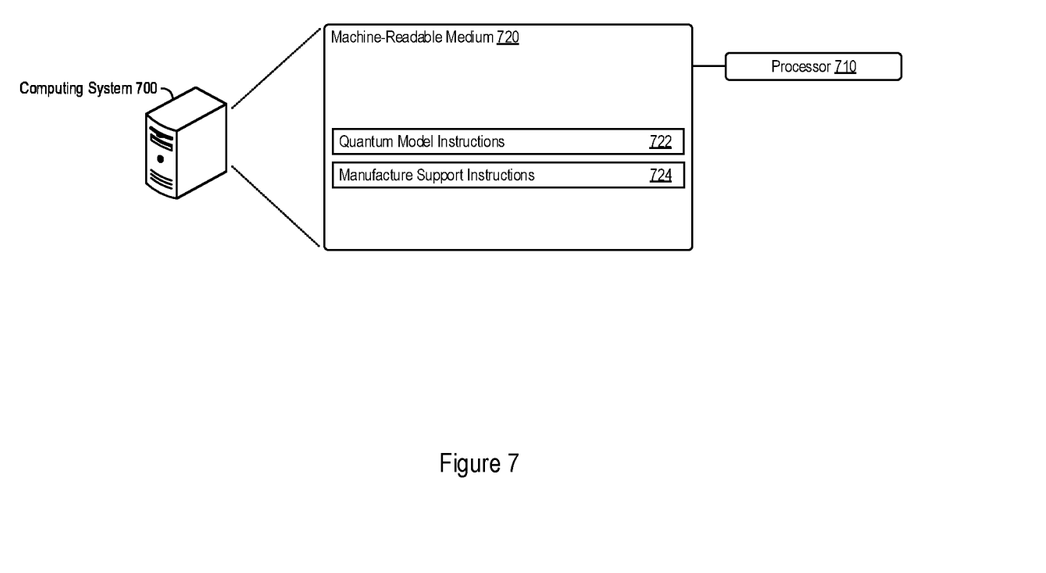
FIG. 7 shows an example of a computing system that supports limited basis quantum particle definitions in EDA processes.

FIG. 7 shows an example of a computing system 700 that supports limited basis quantum particle definitions in EDA processes. The computing system 700 may include a processor 710, which may take the form of a single processor or multiple processors. The processor(s) 710 may include a central processing unit (CPU), microprocessor, or any hardware device suitable for executing instructions stored on a machine-readable medium. The computing system 700 may include a machine-readable medium 720. The machine-readable medium 720 may take the form of any non-transitory electronic, magnetic, optical, or other physical storage device that stores executable instructions, such as the quantum model instructions 722 and manufacture support instructions 724 shown in FIG. 7. As such, the machine-readable medium 720 may be, for example, random access memory (RAM) such as a dynamic RAM (DRAM), flash memory, spin-transfer torque memory, an electrically-erasable programmable read-only memory (EEPROM), a storage drive, an optical disk, and the like.

The computing system 700 may execute instructions stored on the machine-readable medium 720 through the processor 710. Executing the instructions may cause the computing system 700 to perform any of the limited basis quantum particle definition features described herein, including according to any of the features of the quantum model engine 110, the manufacture support engine 112, or combinations of both.

For example, execution of the quantum model instructions 722 by the processor 710 may cause the computing system 700 to generate a quantum computing model to represent an EDA process, and the EDA process may be a multi-patterning process to assign colors to geometric elements of the circuit design. The quantum computing model generated by the quantum model engine 110 may include a quantum particle type defined to prohibit non-physical states in the quantum computing model from occurring. Execution of the quantum model instructions 722 by the processor 710 may further cause the computing system 700 to generate a color assignment for the geometric elements of the circuit design through the quantum computing model. Execution of the manufacture support instructions 724 may cause the computing system 700 to use the color assignment to support manufacture of circuit layers of the circuit design through multiple manufacturing steps.

The systems, methods, devices, and logic described above, including the quantum model engine 110 and the manufacture support engine 112, may be implemented in many different ways in many different combinations of hardware, logic, circuitry, and executable instructions stored on a machine-readable medium. For example, the quantum model engine 110, manufacture support engine 112, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the quantum model engine 110, the manufacture support engine 112, or combinations of both.

The processing capability of the systems, devices, and engines described herein, including the quantum model engine 110 and the manufacture support engine 112, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
forming a quantum computing model to represent an electronic design automation (EDA) process for a circuit design, wherein:
the EDA process comprises a multi-patterning process to assign colors to geometric elements of the circuit design;
the quantum computing model comprises a quantum particle type defined to prohibit a non-physical state in the quantum computing model from occurring; and
generating a color assignment for the geometric elements of the circuit design through the quantum computing model; and
using the color assignment to support manufacture of circuit layers of the circuit design through multiple manufacturing steps.

2. The method of claim 1, wherein the non-physical state prohibited by the quantum particle type is a state of the quantum computing model in which two quantum particles occupy a same model site of the quantum computing model.

3. The method of claim 1, wherein the quantum computing model comprises an objective function that specifies a cost value for a given state of the quantum computing model; and
wherein generating the color assignment comprises determining a ground state with a minimum cost value for the quantum computing model.

4. The method of claim 1, wherein the multi-patterning process comprises a double-patterning process; and
comprising generating the quantum computing model such that only the quantum particle type exists in the quantum computing model and that for a given state of the quantum computing model:
a model site not occupied by a quantum particle of the quantum particle type corresponds to a first color in the double-patterning process; and
a model site occupied by a quantum particle of the quantum particle type corresponds to a second color in the double-patterning process.

5. The method of claim 1, wherein the multi-patterning process comprises a triple-patterning process; and
comprising generating the quantum computing model such that a first quantum particle type and a second quantum particle type exist in the quantum computing model and that for a given state of the quantum computing model:
a model site occupied by a quantum particle of the first quantum particle type corresponds to a first color in the triple-patterning process;
a model site occupied by a quantum particle of the second quantum particle type corresponds to a second color in the triple-patterning process; and
a model site not occupied by any quantum particle corresponds to a third color in the triple-patterning process.

6. The method of claim 1, wherein the multi-patterning process comprises a triple-patterning process; and
comprising generating the quantum computing model such that a first, second, third, and fourth quantum particle type exist in the quantum computing model and that for a given state of the quantum computing model:
a model site occupied by a quantum particle of the first quantum particle type corresponds to a first color in the triple-patterning process;
a model site occupied by a quantum particle of the second quantum particle type corresponds to a second color in the triple-patterning process; and
a model site occupied by a quantum particle of the third quantum particle type corresponds to a third color in the triple-patterning process; and
further generating the quantum computing model by setting a penalty parameter to disincentivize a given model site being occupied by a quantum particle of the fourth quantum particle type.

7. The method of claim 1, wherein the computing system comprises a quantum computing system that supports quantum annealing; and
wherein generating the coloring assignment comprises determining a ground state of the quantum computing model via quantum annealing.

8. A system comprising:
a quantum model engine configured to:
generate a quantum computing model to represent an electronic design automation (EDA) process for a circuit design, wherein:
the EDA process comprises a multi-patterning process to assign colors to geometric elements of the circuit design;
the quantum computing model comprises a quantum particle type defined to prohibit a non-physical state in the quantum computing model from occurring; and
generate a color assignment for the geometric elements of the circuit design through the quantum computing model; and
a manufacture support engine configured to use the color assignment to support manufacture of circuit layers of the circuit design through multiple manufacturing steps.

9. The system of claim 8, wherein the non-physical state prohibited by the quantum particle type is a state of the quantum computing model in which two quantum particles occupy a same model site of the quantum computing model.

10. The system of claim 8, wherein the quantum computing model comprises an objective function that specifies a cost value for a given state of the quantum computing model; and
wherein the quantum model engine is configured to generate the color assignment by determining a ground state with a minimum cost value for the quantum computing model.

11. The system of claim 8, wherein the multi-patterning process comprises a double-patterning process; and
wherein the quantum model engine is configured to generate the quantum computing model such that only the quantum particle type exists in the quantum computing model and that for a given state of the quantum computing model:
a model site not occupied by a quantum particle of the quantum particle type corresponds to a first color in the double-patterning process; and
a model site occupied by a quantum particle of the quantum particle type corresponds to a second color in the double-patterning process.

12. The system of claim 8, wherein the multi-patterning process comprises a triple-patterning process; and
wherein the quantum model engine is configured to generate the quantum computing model such that a first quantum particle type and a second quantum particle type exist in the quantum computing model and that for a given state of the quantum computing model:
a model site occupied by a quantum particle of the first quantum particle type corresponds to a first color in the triple-patterning process;
a model site occupied by a quantum particle of the second quantum particle type corresponds to a second color in the triple-patterning process; and
a model site not occupied by any quantum particle corresponds to a third color in the triple-patterning process.

13. The system of claim 8, wherein the multi-patterning process comprises a triple-patterning process; and
wherein the quantum model engine is configured to generate the quantum computing model such that a first, second, third, and fourth quantum particle type exist in the quantum computing model and that for a given state of the quantum computing model:
a model site occupied by a quantum particle of the first quantum particle type corresponds to a first color in the triple-patterning process;
a model site occupied by a quantum particle of the second quantum particle type corresponds to a second color in the triple-patterning process; and
a model site occupied by a quantum particle of the third quantum particle type corresponds to a third color in the triple-patterning process; and
wherein the quantum model engine is further configured to generate the quantum computing model by setting a penalty parameter to disincentivize a given model site being occupied by a quantum particle of the fourth quantum particle type.

14. The system of claim 8, wherein the quantum model engine is implemented by a quantum computing system that supports quantum annealing; and
wherein the quantum model engine is configured to generate the coloring assignment by determining a ground state of the quantum computing model via quantum annealing.

15. A non-transitory machine-readable medium comprising instructions that, when executed by a processor, cause a computing system to:
generate a quantum computing model to represent an electronic design automation (EDA) process for a circuit design, wherein:
the EDA process comprises a multi-patterning process to assign colors to geometric elements of the circuit design;
the quantum computing model comprises a quantum particle type that is defined to prohibit a non-physical state in the quantum computing model from occurring; and
generate a color assignment for the geometric elements of the circuit design through the quantum computing model; and
use the color assignment to support manufacture of circuit layers of the circuit design through multiple manufacturing steps.

16. The non-transitory machine-readable medium of claim 15, wherein the non-physical state prohibited by the quantum particle type is a state of the quantum computing model in which two quantum particles occupy a same model site.

17. The non-transitory machine-readable medium of claim 15, wherein the quantum computing model comprises an objective function that specifies a cost value for a given state of the quantum computing model; and
comprising instructions to generate the color assignment by determining a ground state with a minimum cost value for the quantum computing model.

18. The non-transitory machine-readable medium of claim 15, wherein the multi-patterning process comprises a double-patterning process; and
comprising instructions to generate the quantum computing model such that only the quantum particle type exists in the quantum computing model and that for a given state of the quantum computing model:
a model site not occupied by a quantum particle of the quantum particle type corresponds to a first color in the double-patterning process; and
a model site occupied by a quantum particle of the quantum particle type corresponds to a second color in the double-patterning process.

19. The non-transitory machine-readable medium of claim 15, wherein the multi-patterning process comprises a triple-patterning process; and
   comprising instructions to generate the quantum computing model such that a first quantum particle type and a second quantum particle type exist in the quantum computing model and that for a given state of the quantum computing model:
      a model site occupied by a quantum particle of the first quantum particle type corresponds to a first color in the triple-patterning process;
      a model site occupied by a quantum particle of the second quantum particle type corresponds to a second color in the triple-patterning process; and
      a model site not occupied by any quantum particle corresponds to a third color in the triple-patterning process.

20. The non-transitory machine-readable medium of claim 15, wherein the multi-patterning process comprises a triple-patterning process; and
   comprising instructions to generate the quantum computing model such that a first, second, third, and fourth quantum particle type exist in the quantum computing model and that for a given state of the quantum computing model:
      a model site occupied by a quantum particle of the first quantum particle type corresponds to a first color in the triple-patterning process;
      a model site occupied by a quantum particle of the second quantum particle type corresponds to a second color in the triple-patterning process; and
      a model site occupied by a quantum particle of the third quantum particle type corresponds to a third color in the triple-patterning process; and
   further comprising instructions to generate the quantum computing model by setting a penalty parameter to disincentivize a given model site being occupied by a quantum particle of the fourth quantum particle type.

* * * * *